(No Model.) 3 Sheets—Sheet 1.
P. C. SOUTHWICK.
BALING PRESS.
No. 536,765. Patented Apr. 2, 1895.
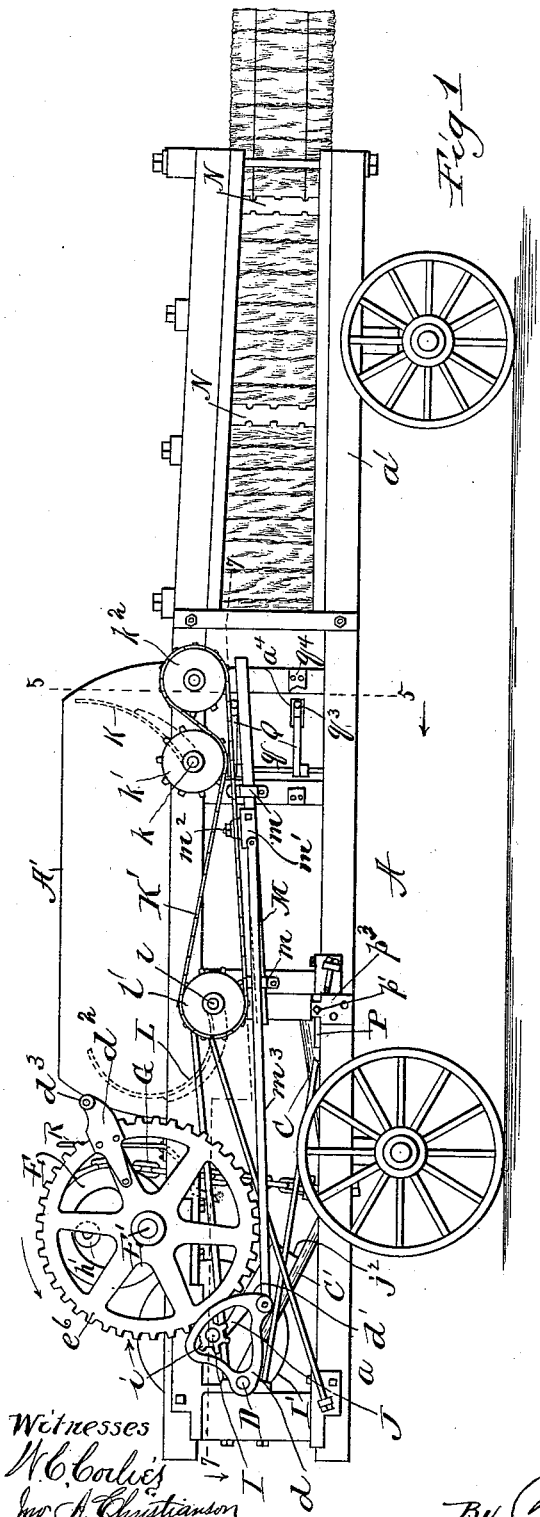
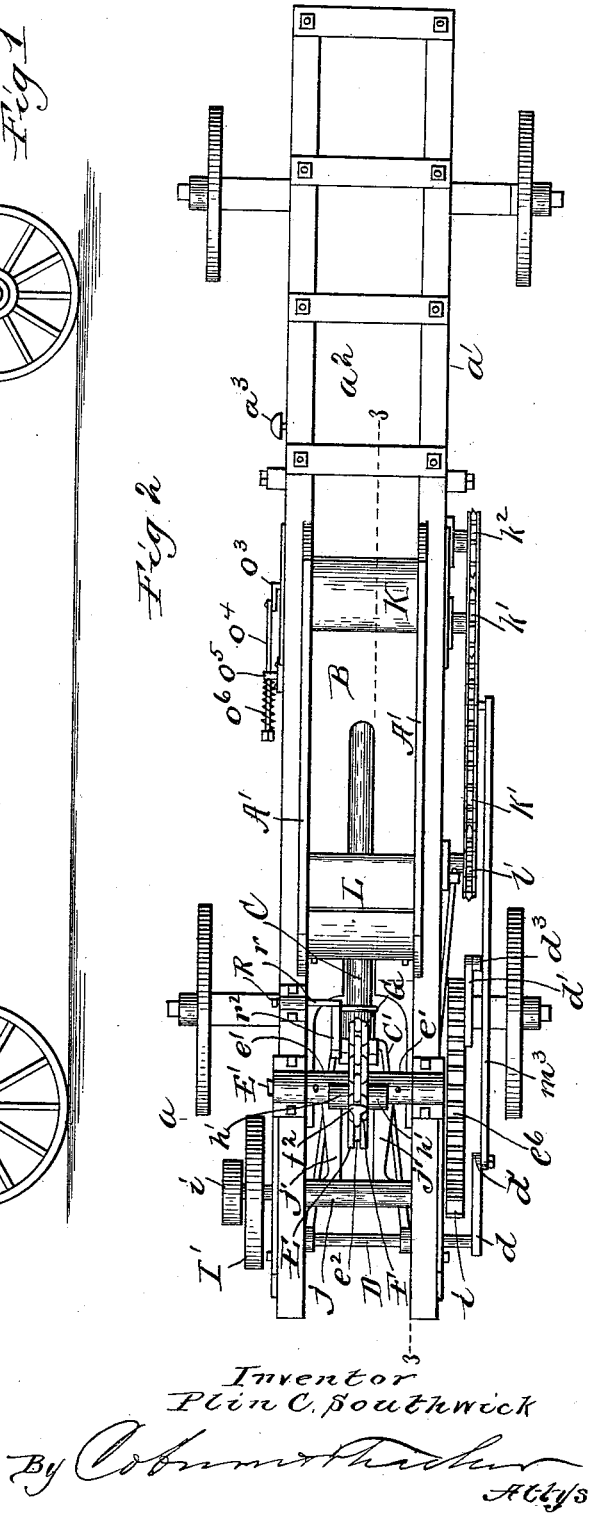
Witnesses
W. C. Coulies
Jno. A. Christianson
Inventor
Plin C. Southwick
By Coburn & Thacher
Attys

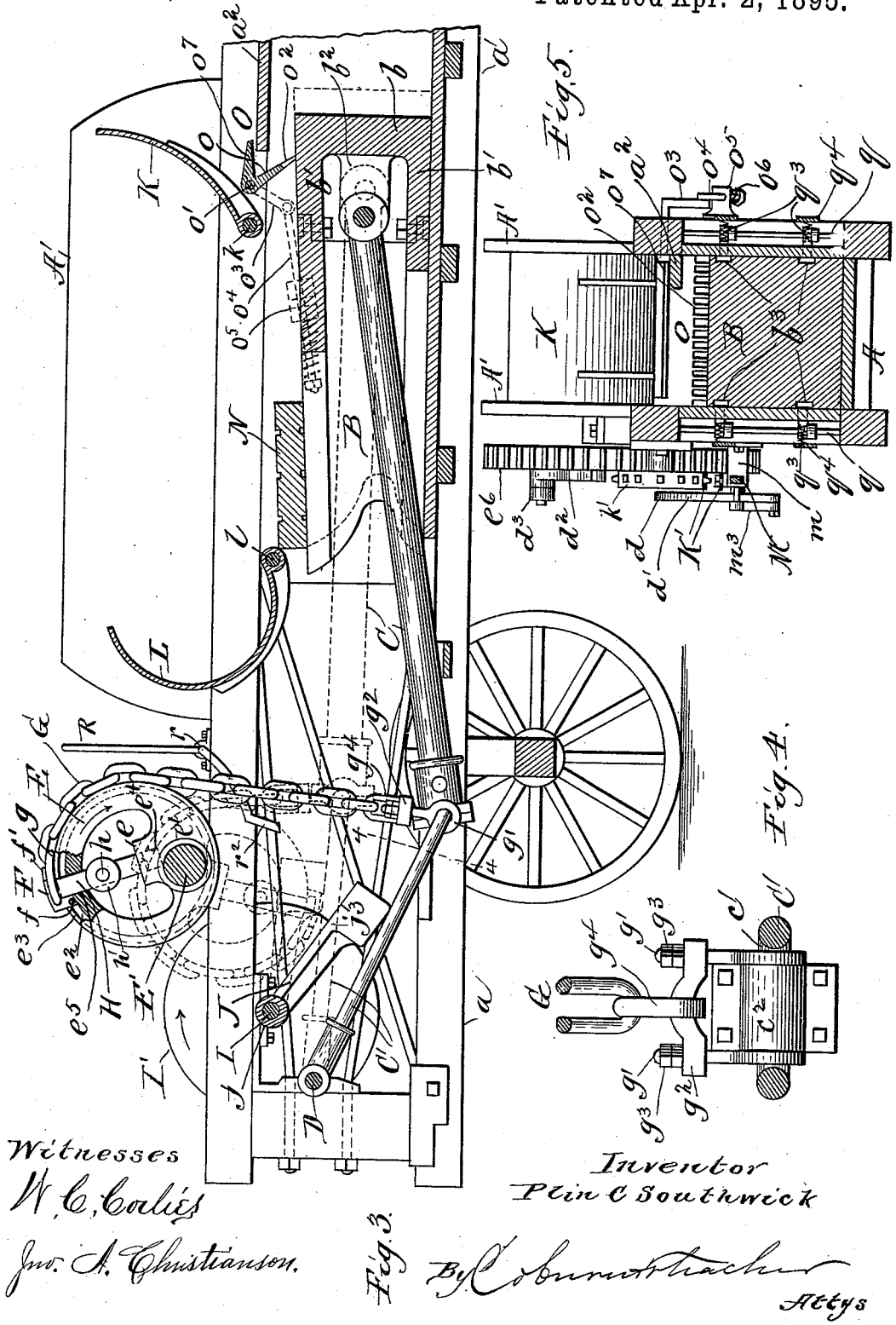

(No Model.)  3 Sheets—Sheet 3.
P. C. SOUTHWICK.
BALING PRESS.
No. 536,765.   Patented Apr. 2, 1895.
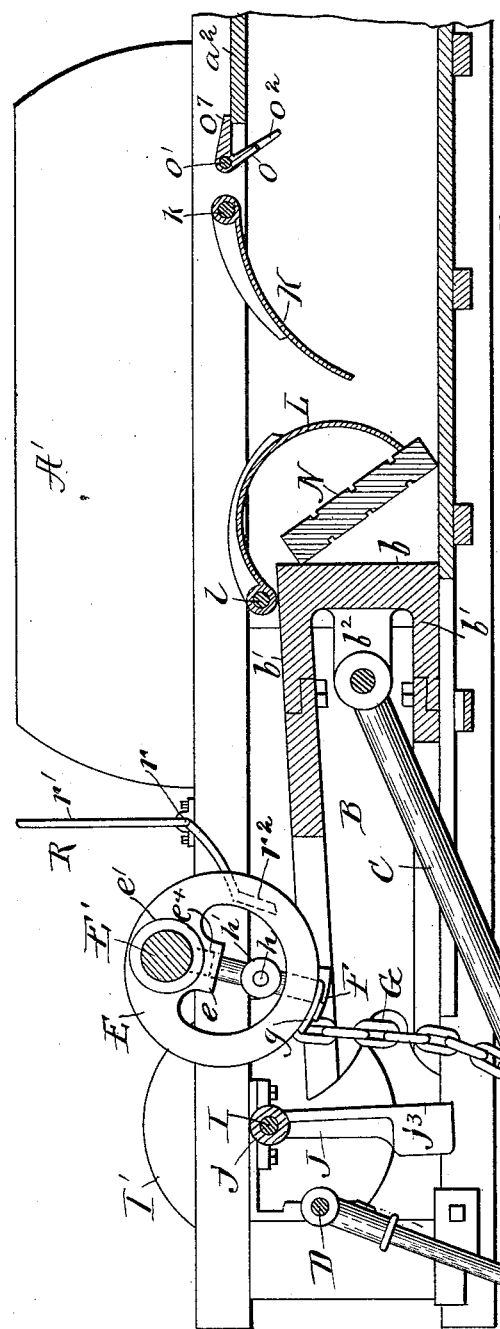
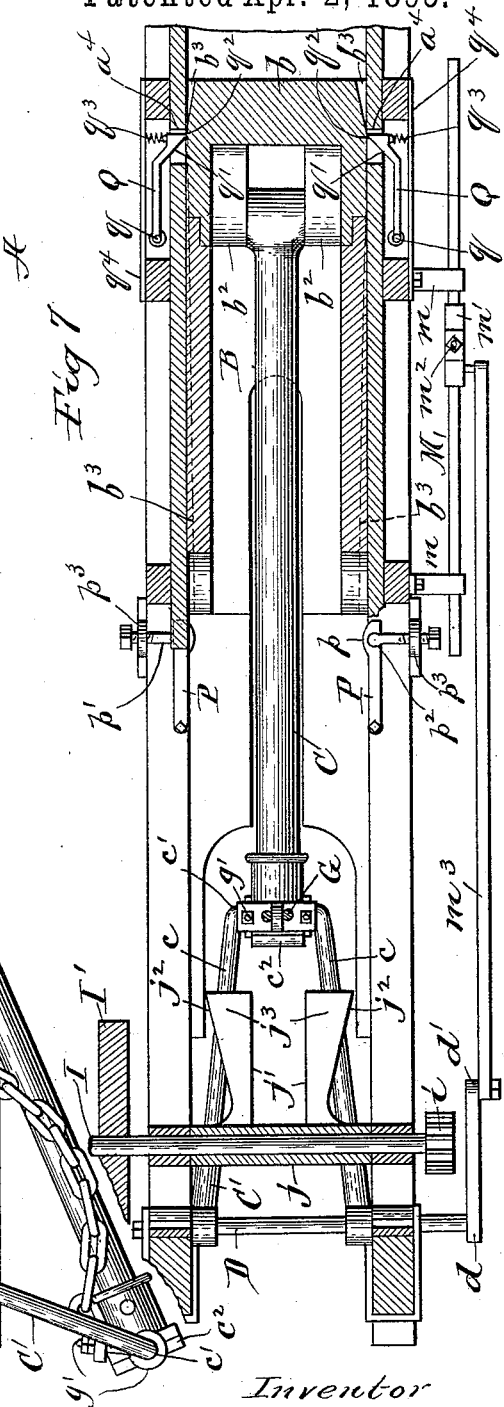
Witnesses
W. C. Colies
Jno. A. Christianson
Inventor
Plin C Southwick
By Coburn & Thacher
Attys

UNITED STATES PATENT OFFICE.

PLIN C. SOUTHWICK, OF SANDWICH, ILLINOIS.

BALING-PRESS.

SPECIFICATION forming part of Letters Patent No. 536,765, dated April 2, 1895.

Application filed December 12, 1893. Serial No. 493,498. (No model.)

*To all whom it may concern:*

Be it known that I, PLIN C. SOUTHWICK, a citizen of the United States, residing at Sandwich, in the county of De Kalb and State of Illinois, have invented certain new and useful Improvements in Baling-Presses, which are fully set forth in the following specification, reference being had to the accompanying drawings, in which—

Figure 1 represents a side elevation of a baling press embodying my invention; Fig. 2, a plan view of the same; Fig. 3, a vertical section part way along the length of the machine and on the broken line 3. 3 of Fig. 2, with the plunger at its inward thrust; Fig. 4, a detail section of the connection between the plunger, toggle and operating devices, taken on the line 4. 4 of Fig. 3; Fig. 5, a cross-section taken on the line 5. 5 of Fig. 1; Fig. 6, a section similar to Fig. 3, but with the plunger retracted; and Fig. 7, a plan section taken on the broken line 7. 7 of Fig. 1, with the parts in position shown in Fig. 3. In these drawings, Figs. 1 and 2 are upon a single scale. Figs. 3, 5, 6, and 7 are upon another and enlarged scale; and Fig. 4 is upon a scale by itself still further enlarged.

My invention relates to power baling presses for the purpose of making compressed bales of hay, straw, or any other material to which the machine is applicable. The invention relates particularly to the mechanism for actuating the plunger, and is an improvement upon the mechanism for this purpose described and shown in my prior patent, No. 458,641, dated September 1, 1891.

The invention consists in certain devices and combinations of devices for actuating and controlling the plunger, together with some minor attachments operating in connection therewith; and I will describe in detail the construction and operation of a machine embodying my invention, and the particular improvements which I believe to be new and wish to secure by Letters Patent will then be defined more fully and distinctly in the claims.

The cam is provided with a circumferential groove, $e^2$, running entirely around the rim of the cam, and at the bottom of this groove there is a narrow shallow channel, $e^3$, set outward on each side, so that the entire groove is a kind of T-shaped channel. In this rim-groove of the cam there is loosely mounted a block, F, the body of which is adapted to easily fit the main portion of the groove, and is provided with pins, $f$, extending at each side respectively of the block and adapted to enter the respective foot-channels, $e^3$, thereby securing the block to the cam but at the same time leaving it free to slide around in the rim-groove. These two devices, the cam, E, and block, F, may be constructed as shown in my prior patent, in which the rim of the cam is cast with a plain right angled groove or channel as a separate piece, and a narrow band is then shrunk on each edge of the cam-rim, these bands being a little wider than the edge surfaces outside of the groove, so that when shrunk upon the rim they will extend slightly over the groove on each side, but at the same time leave a central opening between their inner edges. This provides a completed groove of the same shape mentioned above. The advantage is in the manufacture of the cam, which is difficult to cast entire though it may be done.

I prefer to set the pin, $f$, loosely in the block, F, making this pin long enough to furnish the required projections on each side of the block. At a certain point in the cam an aperture is provided, through which the pin may be slipped into the hole provided for it in the block, in which it is left loose but will be held from slipping out by the faces of the cam groove underneath the projecting bands. This greatly facilitates the application of the block to the cam and the detachment therefrom; but these features are not absolute essentials to the main features of my invention, and the devices just referred to may be constructed in any way which is suitable for the operation intended. This block, F, is connected by a chain or cable, G, to the arms of the toggle at their connecting joint, as seen in Fig. 3. As shown in the drawings, the cable is connected to the block by means of a long link, $g$, and the block is provided with a kind of lip, $f'$, which projects forward over this link and at its free end is widened to extend out on each side over the link, as seen in Figs. 2 and 3, thereby serving as a kind of keeper to prevent the link from turning outward, the lateral extensions of the lip for this purpose being substantially short side-lugs, $f^2$, as seen in said figures. This particular construction, however, is not claimed here, as it is the subject matter of claims in my prior application, Serial No. 486,440.

The plunger is operated by the following mechanism: The reciprocal movement of the plunger is effected by the opening and closing of a pair of toggle-arms, C—C', the first of which is hinged at one end to the lug within the hollow head, and extends thence outward toward the front end of the machine and downward in a position of rest, as seen in Fig. 6. The other arm, C', is hinged at one end to the outer end of the arm, C, and at its other or outer end is secured to a rock-shaft, D, mounted in suitable bearings at the front end of the frame near the upper portion thereof and transversely of the machine. This member, C', of the toggle, as shown in the drawings, consists of a single rod bent into U-shape, the two legs, $c$, being secured in any suitable way to the said rock-shaft, while the section, $c'$, joining the legs is a short straight piece which is journaled to the end of the member, C, by an ordinary half-bearing in the end of this arm and an ordinary bearing-cap, $c^2$, secured to the end of the said arm, C. It is obvious that the straightening or closing of this toggle will thrust the plunger along into the compression chamber, as seen in Fig. 3. If the toggle-arms were absolutely straightened, or in other words the toggle absolutely closed, obviously the greatest forward travel of the plunger would be completed at this point, and of course it will be understood that the force brought to bear upon the plunger is increased as the toggle-arms are straightened in accordance with the well known operation of the toggle.

It will be noticed that the toggle is arranged so that it is under all conditions entirely below the upper portion of the frame. The two hinge points are both below the top of the frame, and the movement of the arms at their hinge connection is downward instead of upward, which results in keeping the toggle always below the top of the press-frame, as seen in Figs. 3 and 6.

The actuating device for straightening the toggle-arms is a cam, E, fixed on a revolving shaft, E', mounted in suitable bearings on the top of the frame and arranged transversely thereof a little in front of the side-boards, A', as seen in Figs. 2 and 3. This cam is of annular construction, so that the center is mainly an open space, though at one side there is an enlargement, $e$, extending inward, from each side of which near the rim of the cam projects outward sleeve-hubs, $e'$, through which the shaft, E', passes. These sleeve hubs are fastened to the shaft by set screws, pins, or any suitable device, thereby securing the cam to the shaft so that it will move with it.

In the drawings, A represents a press-frame which in all general features is of ordinary construction, for instance, substantially the same as in my said prior patent. This frame is usually mounted on wheels, and is so shown in the drawings. In general form this press-frame is practically a long horizontal chute, as it stands mounted on wheels, and may be described as consisting of two sections, one the front section, $a$, which is closed on all sides so as to provide a practically closed chamber within which the material is compressed. This chamber is about half the length of the chute, and the section, $a'$, at the rear thereof is simply an extension, but is open at the sides and preferably tapers slightly from the end of the closed chamber to the discharge end of the chute. The mechanism for actuating the plunger is also mounted on the press-frame in front of the closed chamber, the frame being extended in front of said chamber sufficiently far to accommodate the mounting of the said mechanism thereon. The top, $a^2$, of the chamber is cut away from the front end of the chamber nearly the whole distance back, this top reaching over and covering only a short portion of the chamber at the rear end thereof, as seen in Figs. 2 and 3. A plunger, B, is mounted to reciprocate back and forth in this chamber in the usual manner; and this plunger is of substantially ordinary construction, consisting of a hollow rectangular head, $b$, and from the wings or sides of this hollow head, skeleton side pieces or arms, $b'$, extending still farther back from the face of the head of the plunger; and the wings or sides of the latter with these extensions are slightly tapering, as seen in Figs. 3 and 6. Within the hollow head of the plunger there is a rear projection or lug, $b^2$, which provides for connecting the actuating devices to the plunger, by which it is reciprocated, as will be described presently.

When the plunger is retracted to its farther position at the front end of the machine, it is just at the end of the compression chamber. This position of the plunger is represented in Fig. 6, from which it will be seen that the plunger head just rests on the front end of the chamber bottom, while the space above at the top of the chamber is open. On the sides of the frame are two upright boards with side pieces, A', secured to the respective upper side-beams of the latter and extending the length of the compression chamber and somewhat beyond the front end of the latter, as seen in Fig. 3. These side pieces act as guides for the introduction of the material which is thrown into the open space between these two uprights, which are practically extensions of the frame.

At its lower end the cable is connected to the joint of the toggle-arms by means of short link bars, $g'$, which are mounted loosely on the straight short section, $c'$, of the toggle, C', being arranged on each side of the journal-bearing of the latter, as seen in Fig. 4. The outer ends of these link bars are joined by a yoke, $g^2$, through which the ends of the links pass and are secured in place by means of nuts, $g^3$, turned on their projecting extremities. The cable is connected to the toggle by passing this yoke through the last lower link, $g^4$, of the cable, obviously thereby securing it to the link-arms and so to the toggle-arms at their connecting-joint. In putting these parts together it will be evident that either the link-arms must be slipped upon the toggle-arm, C', before bending, or their bearing apertures must be much larger than this rod, so that they can be slipped around the bends in the latter.

The sliding block is secured temporarily to the cam at one point in the rim-groove thereof by means of a sliding-bar, H, which is loosely mounted at its inner end in a suitable socket, $e^4$, in the enlargement, $e$, while the outer end passes loosely through an aperture, $e^5$, in the rim of the cam; this end of the bar and the aperture through which it passes being as wide as the widest portion or bottom of the rim groove, so that obviously when the bar is slid outward it will stand in the way of the pins on the sliding-block and so stop the latter on the cam at this point, holding it against any further movement in the cam-groove by strain on the cable connected thereto.

On each side of the sliding bar near its outer end there is a short laterally projecting pin, $h$, which serves as a journal to a roller, $h'$, mounted loosely on each pin. The outer end of the bar is longer and heavier than the inner end, and the rollers with their bearings increase this weight. The bar is arranged diametrically of the cam but not quite vertically to the shaft of the latter, as seen in Fig. 3; and when the cam is turned downward, the bar will drop or slide outward by gravity alone, the weight of the bar being sufficient to insure this action with certainty. This is the position which these parts assume upon the retraction of the plunger and while they remain at rest, as seen in Fig. 6, so that the sliding-arm will be ready to engage the block when the cam is turned in the direction indicated by the arrows in Figs. 3 and 6.

The cam shaft is rotated by a shaft, I, arranged transversely of the frame and mounted in suitable bearings thereon below the top-bars of the frame and near their front ends. A band pulley, $i$, or any suitable driving device is secured to one end of this shaft, which projects beyond the frame at what, for convenience, I have called the back side, and by this pulley the shaft is revolved by any motor whatever suitable for this purpose. A gear-pinion, $i'$, is secured to the opposite end of this shaft which projects a little from the front side of the frame, and this pinion engages with a large gear wheel, $e^6$, fixed on the projecting end of the cam-shaft, E', at the front side of the machine, as seen in Fig. 1, thereby communicating a rotary movement to the said shaft and cam mounted thereon.

The resistance in the practical working of the machine changes to a very considerable degree, and for the purpose of aiding in overcoming this resistance and steadying the action of the machinery, it is desirable to employ a balance or fly-wheel. In the drawings I have shown such a wheel, I', secured to the drive-shaft, I, near the driving-pulley thereon; but this is not an absolute essential to my invention. Now, when the driving-shaft is rotated by its pulley in the direction indicated by the arrow, Figs. 2 and 3, obviously it will impart a rotary movement to the cam-shaft in the opposite direction or in the direction indicated by arrows in Figs. 1 and 6, and as explained above, this is a movement which engages the block on the cam when the latter starts from its lower position of rest seen in Fig. 6. This rotation of the cam from its said lower position will, therefore, wind up the cable thereon, as seen in Fig. 3, which obviously will bring a strain upon the toggle in a direction to thrust the plunger inward by a gradual straightening of the toggle-arms, as illustrated in Fig. 3; but it is evident that at a certain point the block must be released on the cam, this point being at the completion of the forward thrust of the plunger or when the toggle is about closed. The point at which this release is to take place is about as the cam reaches its lowest position, and the releasing device is a kind of swinging gate, J, provided with surfaces which are brought up to act upon the rollers on the sliding bar to effect a disengagement from the latter of the block. This swinging device consists of a sleeve-shaft, $j$, which is mounted loosely on the driving-shaft, I, as seen in Fig. 7, and is provided with two radial arms, $j'$, projecting inward toward the plunger—that is, toward the rear end of the machine. These arms are arranged at such a distance apart as to permit the cam to pass freely between them, but not the laterally projecting rollers on the sliding bar. The arms are also constructed so that their outer ends will be in about the same vertical plane as the respective legs of the toggle-arm, C', and their outer ends may be enlarged underneath the surface so as to provide a kind of block, $j^2$, on each which will rest on the respective legs of this toggle-arm, when the latter is swung upward from its position of rest, as seen in Fig. 6, and as illustrated by Figs. 3 and 7. The upper sides of these swinging arms are constructed to provide straight, flat faces, $j^3$, as seen in Fig. 7, and it is obvious that the straightening of the toggle-arms will early in the movement bring the arm, C', into contact with the said swinging arms, which at rest depend vertically from the shaft on which they are hung, as seen in Fig. 6, and will gradually swing these arms up into the path of the rollers on the sliding bar; and as the cam is turned downward in its backward movement these rollers will finally be brought into contact with the said surfaces which act as cam-surfaces to raise the rollers, thereby lifting the sliding-bar and disengaging it from the sliding-block, the position of the several parts just at the point where this action takes place being shown in dotted lines in Fig. 3. The moment the block is released by this retraction of the sliding-bar, it will at once and quickly slide forward in the rim-groove on the cam under the weight of the devices attached thereto, thereby permitting the toggle-arms to partially fold and retract the plunger into the position of rest seen in Fig. 6, the swinging cam-gate dropping again into the pendent position, also seen in the same figure. The rotation of the driving-shaft being continuous, the devices are, of course, soon brought into operative connection again, and the movement of the plunger, above described, is repeated.

It is desirable to insure the certain return of the plunger and its actuating devices to the position of rest seen in Fig. 6 in case of an accidental release of the sliding block before the compression is completed, or in case the gravity movement of the device is not sufficient to always bring the plunger back to its state of rest. For this purpose a cam, $d$, is fastened to the projecting end of the rock-shaft, D, on the same side of the frame as the gear-wheel, $e^6$, so as to be vibrated by the oscillations of the said shaft. This cam may be either a plate of triangular shape or a skeleton frame of like shape, as seen in Fig. 1. It is secured at its apex to the shaft and flares or increases in width as it extends outward therefrom toward the said gear-wheel, and its outer or cam-surface, $d'$, is curved or convex, as also seen in said Fig. 1. On the outside of the large gear-wheel, $e^6$, there is secured an arm, $d^2$, arranged radially of the wheel and extending somewhat beyond the periphery thereof, as seen in Fig. 1. This arm is either arranged in the same plane as the cam just described, or is provided with a laterally projecting pin carrying a roller, $d^3$, which is in the same plane with the said cam, as seen in Figs. 1 and 2. In the rocking of the shaft, D, by the forward movement of the plunger already described, this cam will be thrown upward, as indicated in Fig. 1, and in case of accidental release of the block, or failure of the plunger to return automatically, as mentioned above, this arm or its roller will come in contact with the said cam on the backward turn of the operating cam and force the said cam, $d$, downward, thereby oscillating the shaft, D, in a direction to retract the plunger, and so positively insure the return of the devices to the position of rest seen in Fig. 6.

As already mentioned, there is a free open space between the side-boards at the top of the frame and extending down to the bottom of the said frame when the plunger is retracted. It is into this space between the side-boards that the hay or other material to be baled is delivered; but there are provided devices for bringing it into better shape and position for the compressing action of the plunger than would be the case if it was simply tossed into the chamber in front of the plunger. These devices are two wide concavo-convex plates, K and L, which are fastened respectively to rock-shafts, $k$ and $l$, mounted transversely of the press-frame and at the upper portion thereof. The first plate with its shaft is arranged near the rear end of the compression chamber just a little in front of the chamber-top, as seen in Fig. 3, and the shaft is mounted in the upper side-bars of the frame. The other plate, L, with its shaft is arranged near the front end of this space and its shaft is mounted just below the upper side-bars, as seen in Fig. 3. The curve of the forward plate, L, is sharper than that of the plate, K, as shown in the drawings, being about in the arc of a circle. At the front side of the frame these shafts project a little, and have fixed thereon, respectively, sprocket-wheels, $k'$ and $l'$. Just in rear of the sprocket, $k'$, is also mounted a loose or idle sprocket, $k^2$, and an ordinary drive-chain, K', is passed around the two sprocket-wheels, $l'$ and $k^2$, in its course between the said two wheels being run underneath the sprocket, $k'$, and engaging therewith, as seen in Fig. 1. Now, it is evident that if a reciprocating movement is given to this chain, it will oscillate the two plate-shafts in opposite directions, thereby giving a similar vibratory movement to the curved plates attached thereto and extending the length thereof so as to fill the space between the two side-boards, as seen in Fig. 2. To effect such a movement of the chain a sliding-bar, M, is mounted on the same side of the frame as the said sprocket-wheels and just below them, being retained in suitable keepers, $m$, fastened to the side of the frame as seen in Fig. 1. This slide is just underneath the lower section of the chain and is secured thereto in any suitable way. In the drawings, a small block, $m'$, is fastened to the bar and is secured to the chain by a stud on its upper face which passes up through one of the chain links and is fastened by a nut, $m^2$. A connecting rod or pitman, $m^3$, is hinged at one end to this bar and extends thence to the front end of the machine, where its outer end is hinged to the lower arm of the cam, $d$, on the rock-shaft, D, as seen in Fig. 1. Now, it is evident that by the swinging of this cam by the oscillation of the said shaft, as already described, a reciprocating movement will be imparted to the said drive-chain, the bar connected thereto being free to slide in its keeper, and this reciprocation will impart an oscillatory movement to the plate-shafts in opposite directions, first one way and then the other. This movement in one direction will obviously swing the said plates up into the space between the side-boards, as seen in Fig. 3, while the movement in the opposite direction will turn them down into the press-chamber, as seen in Fig. 6. The relative arrangement of the driving devices is such that, when the plunger is moved forward and the cam, $d$, is thrown upward by this movement, the plates or wings will be turned upward, as seen in Fig. 3. The hay or other material is thrown into the space between the side-boards at this time, and upon the retraction of the plunger the drive-chain will, of course, be moved in the opposite direction, thereby oscillating the plate-shafts in the opposite direction and so turning the curved plates down into the press-chamber, as seen in Fig. 6. This forces the hay or other material down into the chamber with some degree of compression in front of the plunger in its retracted position, and there holds it until the forward movement of the plunger commences, thus bringing the hay into position in front of the plunger and in much better condition for the action of the latter than if it was simply tossed into the chamber. As the hay is thus fed in, it is evident that it will at first rest upon the top of the plunger; but this will not at all interfere with the retraction of the latter as it slips back underneath the hay. This retracting movement of the plunger is very quick, in fact almost instantaneous the moment the block is released on the actuating cam, as already described, and the downward turn of the plates is instantaneous with this movement of the plunger, so that the hay for the next section of the bale is quickly forced down into the chamber ready for compression. This action of the plates is fully completed by the contact of the arm on the gear-wheel with the cam, $d$, which will almost always occur at the upper end or corner of the said cam in any event. This contact will, of course, complete the swing of the cam, which will bring the plates or wings down into their lowest position in the chamber to deliver and quickly compress the hay therein.

The curved feed plates and the mechanism for operating them are no part of my present invention, but constitute the subject matter of claims in an application subsequently filed by me, viz., Serial No. 514,261, filed June 16, 1894. The said mechanism is disclaimed as any part of the invention in the present application.

There is also provided a device for automatically placing a new follower whenever required. There is, of course, a signal device applied to the machine for the purpose of indicating when a new follower is required. I have not shown this device in the drawings except simply a gong, $a^3$, in Fig. 2; but the signal may be as described in my said prior patent, or said prior application, or any other device adapted to the purpose. This signal is always made on the forward thrust of the plunger, and a new follower, N, is at once laid on the top of the plunger at the rear end of the extension thereof, as shown in said Fig. 3, from which it will be seen that the follower is right in the path of the circular plate, L. When the plates are thrown down upon the retraction of the plunger, as just described above, this front one catches the follower as it is pushed off from the end of the plunger by contact with the plate-shaft above and turns it down into position and against the face of the plunger, as seen in Fig. 6, so that it will be pushed forward into position by the next forward movement of the plunger. In order to suitably compress the hay above the plunger as it enters under the top of the chamber, and also to prevent the return of any hay upon the retraction of the plunger, I provide a kind of elastic stop or wing, O. This stop is a narrow plate, $o$, fastened to a shaft, $o'$, extending across the chamber just in front of the top thereof, being mounted in suitable bearings in the upper side bars so as to freely oscillate. The lower edge of the plate is recessed so as to provide a series of short teeth, $o^2$. The shaft projects slightly at the back side of the frame, and is there provided with a crank-arm, $o^3$, to which is hinged a rod, $o^4$, which is carried forward and passed loosely through a keeper, $o^5$, fastened to the side of the frame; and on the end of the rod projecting through the keeper there is placed a spring-coil, $o^6$, arranged between the keeper and a nut on the end of the rod. This spring acts to pull the crank arm forward, thereby holding the toothed plate down upon the top of the plunger, as seen in Fig. 3; but in order to limit this movement and prevent frictional contact between the comb and the plunger, a wing or web, $o^7$, in one piece with the toothed plate extends rearward therefrom at an angle and back far enough to come in contact with the front end of the chamber top to stop the downward movement of the toothed plate at the proper point, as seen in Fig. 3. In the operation of the plunger on its forward movement the hay will be pressed down by this device just described, and all carried in under the top of the chamber by the plunger; and upon the retraction of the latter this toothed plate will be about in contact with the plunger and so stop the withdrawal of any hay by the said retracting movement. It will be obvious that this device will yield by the compression of the spring, according to the quantity of hay which is carried in underneath it by the plunger.

To check the sudden movement backward of the plunger when the compressing devices are released, as already described, a kind of brake is provided. For this purpose on each side of the plunger grooves or rabbets, $b^3$, are cut at the bottom of each side and extending the entire length thereof. These grooves are slightly inclined from the rear to the front end of the plunger, that is, they are deepest at the rear end and gradually run out toward the front end, as seen in Fig. 7. On each side of the frame there are pivoted to the lower side-bars brake-cams, P, these pieces being in the shape of short arms pivoted at one end to the bars, and at their free ends provided with small enlarged cam-faces, $p$, extending inward, as seen in Fig. 7, and adapted to enter and run in the said grooves. The cam surfaces of these brakes are set in the proper distance, to produce the frictional contact required in the grooves of the plunger, by means of set screws, $p'$, which are mounted in threaded keepers, $p^2$, fastened to the sides of the frame. The set screws are arranged to bear against the free ends of the arms, or may be connected therewith by ball and socket-joint, $p^3$, as indicated in Fig. 7. By turning these screws the cams may be set in or out with reference to the plunger so as to increase or decrease the frictional contact with the latter in the inclined grooves already described. Obviously the sudden backward movement of the plunger will be gradually arrested by this frictional contact, the force of which is increased as the plunger retreats.

When a new follower is first driven forward by the plunger, it will have a tendency to move back upon the retreat of the former under the influence of the compressed material in front of it. To prevent this, catch-stops are provided which will drop in behind the follower on the retreat of the plunger and hold the former in place. In the construction shown in the drawings, this device consists of stop-arms, Q, four in number, arranged two on each side of the frame, fixed on an upright rock-shaft, $q$, mounted at the respective sides of the frame between the projecting positions of the side-bars, as seen in Fig. 5. One of these arms is arranged near the upper plane of the plunger and the other near the lower plane thereof, the arrangement being the same on each side of the press-frame. These stop-arms at their free ends are bent inward so as to provide a section, $q'$, standing in at an angle to the main straight portion of the arm, the angle being preferably obtuse. The extremity of this bent end is formed with a straight face in front, that is, a face perpendicular to the straight body of the arm, so that with the inclination of the bend back of this face a wedge-shaped point, $q^2$, is formed, the sharp point or edge of which stands inward. The inward bend of the arm is sufficient to carry this point in beyond the inner face of the side pieces, and to permit this movement, apertures or slots, $a^4$, are made in the sides of the frame just opposite these bends in the stop-arms, so that the points of the latter may be projected through these apertures far enough to bring their front faces entirely within the chamber; and to insure this result springs, $q^3$, are arranged behind the point of each arm, and between it and short supporting-bars, $q^4$, fastened to the adjoining standards of the frame, as seen in Fig. 7. The relative adjustment of the parts is such that the normal action of the springs will force the stop-arms inward until their pointed ends stand inside of the side pieces of the press-frame, and the location of the stops is such that these projecting ends will be just a little in rear of the limit of the forward movement of the plunger, so that almost immediately upon the retraction of the plunger these stops will be in position to arrest the backward movement of a follower. In order to bring the stops into this position to catch the follower the head of the plunger is provided with two short grooves, $b^3$, on each side thereof corresponding to the planes of the respective stops and tapering or inclining outward as they run back, so that they run out at a very short distance from the face of the plunger, as seen in Fig. 7. Now from this construction, seen in said Fig. 7, it is obvious that almost as soon as the retreat of the plunger commences the stops will begin to move outward in these grooves and just at the point where the face of the plunger passes them they will stand in the chamber about their full limit, and so will be directly in the path of the follower and cannot fail to arrest its retreat.

It is possible that the device for releasing the sliding-block or cable-block on the cam may fail to operate through some accident or some defect, or there may be some breakage or some defect suddenly developed in some other part of the machine after the starting of the plunger; and in either case it is obvious that it will be very desirable to be able to disconnect the block from the cam so that the operation of the plunger will be at once arrested. For this purpose I provide a kind of cam-lever, R, which is fastened on the end of a rock-shaft, $r$, mounted horizontally on the frame and carrying at its outer end just outside of the frame a hand lever, $r'$, by means of which the shaft may be oscillated and thereby vibrate the cam-lever. This lever, R, at its outer end is bent to form a kind of straight, flat face, $r^2$, as seen in Figs. 3 and 6, and this is arranged in the plane of the roller on the sliding bar of the cam on the same side of the said cam as the lever itself, as seen in Figs. 2 and 6. Now, if for either of the reasons mentioned above, it is desired to stop the operation of the compressing mechanism, the attendant simply throws the said cam-lever up into the path of the said roller by means of the handle on the rock-shaft, when, of course, the sliding bar will be moved inward to release the block the same as described for the regular releasing device, and so accidental injury to the machine may be avoided.

As the action of the several devices has been described in connection with the description of the construction of the several parts of the mechanism given above, the general operation of the machine will be understood without any further description.

It will be noticed that with my present invention I produce a baling-press in which the entire mechanism for doing the entire work is included in a single machine, with the bare exception of some suitable motor to furnish driving power. The machinery required for making bales of hay or other like material is, therefore, much simplified and brought into a compact and convenient arrangement, and can be run by any kind of a motor adapted to revolve the main or driving shaft of this machine. It will be obvious, however, to good mechanics that many of the special devices herein described and shown may be modified or replaced by others. Such mechanical changes I contemplate, and in fact have actually employed in the practical operation of my invention. Hence, I do not wish to be understood as limiting my invention to all the specific devices and details of arrangement as hereindescribed and shown, provided the main features of the invention are retained.

Having thus described my invention, what I claim to be new, and desire to secure by Letters Patent, is—

1. In a baling press, the plunger, B, in combination with the toggle, C—C', shaft, E', mounted on the press-frame, drive-shaft, I, also mounted on the press-frame and geared to the shaft, E', cam, E, fixed on the shaft, E', and provided with rim-groove, $e^2$—$e^3$, block, F, having lateral pins, $f$, whereby it is connected to the said groove but is free to slide therein, sliding-bar, H, mounted in said cam and provided with a roller, $h'$, on each side thereof, and swinging gate, J, adapted to be turned upward by the straightening of the toggle and provided with arms arranged in the plane of the rollers on the sliding bar, whereby said arms are brought up into the path of said rollers to retract the sliding bar as they come in contact with the arms and thereby release the sliding block from the cam at about the closing of the toggle-arms, substantially as described.

2. In a baling press, the plunger, B, in combination with the toggle, C—C', revoluble shaft, E', mounted on the press-frame, cam, E, fixed on said shaft and provided with rim-groove, $e^2$—$e^3$, sliding-block, F, mounted in said groove and held therein by side pins, $f$, sliding-bar, H, mounted in said cam and provided with side rollers, $h'$, cable, G, connecting the sliding-block with the toggle, swinging gate, J, mounted loosely on the frame above the toggle and provided with projecting-arms, $j'$, arranged in the path of one of the toggle-arms and in the plane of the rollers on the said sliding-bar, and mechanism for revolving the cam-shaft, E', substantially as described.

3. In a baling press, the plunger, in combination with the toggle connected therewith, cam, E, fixed on a revoluble shaft, sliding-block, F, mounted on the periphery of said cam, cable, G, connecting said block and the toggle, sliding bar, H, mounted in said cam and arranged to engage the said block, and a hand lever, R, adapted to retract the sliding-bar to disengage the block from the cam, substantially as described.

4. In a baling press, the actuating cam, E, fixed on a revoluble-shaft, in combination with sliding-block, F, mounted thereon a cable G, connecting said sliding block with the toggle of the plunger, sliding-bar, H, mounted in the said cam and provided with side rollers, $h'$, and rock-shaft, $r$, provided at one end with cam-lever, R, fixed thereon and at the other with hand-lever, $r'$, substantially as described.

PLIN C. SOUTHWICK.

Witnesses:
J. M. THACHER,
ROBERT C. PAGE.